US012802530B2

(12) United States Patent
Pile

(10) Patent No.: US 12,802,530 B2
(45) Date of Patent: Nov. 17, 2026

(54) ONLINE SPORTS BETTING PLATFORM AND METHODS FOR USE

(71) Applicant: Ruel Pile, Newport News, VA (US)

(72) Inventor: Ruel Pile, Newport News, VA (US)

( * ) Notice: Subject to any disclaimer, the term of this patent is extended or adjusted under 35 U.S.C. 154(b) by 191 days.

(21) Appl. No.: 18/430,751

(22) Filed: Feb. 2, 2024

(65) Prior Publication Data

US 2024/0265783 A1 Aug. 8, 2024

Related U.S. Application Data

(60) Provisional application No. 63/444,095, filed on Feb. 8, 2023.

(51) Int. Cl.
*G07F 17/32* (2006.01)

(52) U.S. Cl.
CPC ................................ *G07F 17/3288* (2013.01)

(58) Field of Classification Search
None
See application file for complete search history.

(56) References Cited

U.S. PATENT DOCUMENTS

| | | | | |
|---|---|---|---|---|
| 2021/0319653 | A1* | 10/2021 | Isgar | G07F 17/3288 |
| 2022/0130207 | A1* | 4/2022 | Huke | G07F 17/3244 |
| 2022/0172561 | A1* | 6/2022 | Cronin | G07F 17/3237 |
| 2022/0398898 | A1* | 12/2022 | Huke | G07F 17/3288 |

* cited by examiner

*Primary Examiner* — Stephen T. Reed
(74) *Attorney, Agent, or Firm* — Millen, White, Zelano & Branigan P.C.; William F. Nixon

(57) ABSTRACT

A gaming platform within a gaming network allows players to place bets using picks for a set of games played in a particular time period. A casino provides the match data of point spreads, moneylines, and over/under amounts along with a date and time stamp to certify that the values for these data points are verifiable. A game management server tracks picks and associates them with the match data. After completion of the games, a determination process is executed to determine a winner of the contest depending on several factors and variations.

3 Claims, 8 Drawing Sheets

ONLINE SPORTS BETTING PLATFORM AND METHODS FOR USE

FIELD OF THE INVENTION

The present invention relates to a sports betting platform that allows users to wager on sporting events online or through applications using a computer network to implement proprietary mathematical algorithms based on unique data generated by a centralized casino to determine a winner of the cumulative wagers.

DESCRIPTION OF THE RELATED ART

Not all casinos offer customers the ability to make sports bets. A sportsbook is a casino that accepts bets from individual sports bettors on sporting contests. The sportsbook creates, updates, and maintains current betting lines or odds, such as point spreads, moneylines, and over/under amounts. The values for these items are based on a number of factors:

1) The knowledge and experience of experts within each sport;
2) The health of the athletes within a team prior to the game, especially the team's highest performing athletes;
3) The location of the sports contest;
4) The weather expected during the sports contest, if the event is scheduled outdoors;
5) Any pending league suspension of athletes;
6) Any other non-health related reasons that an athlete may not be available for playing in the game, such as paternity/maternity leave, suspension, family issues, and the like; and
7) The total dollar amount of wagers placed on any single team or game. For example, if the amount of wagers are heavy on one team, then the casino may offer higher odds for the opponent to incentivize customers to bet on the opponent, which offsets the casino's liability.

Traditional sports betting is regulated by state gambling authorities and occurs only between a casino and bettors. At the time of the wager, casinos offer a stated sum certain to the bettor. The amount of the payout is based on the casino's betting odds at the time of the wager, and must be paid by the casino to the bettor if the bettor wins the bet. Casinos do not pool their customers' wagers for a bet originated with an unrelated casino. Instead, a casino only accepts the financial risk for the bets accepted by that specific casino.

Casinos that offer customers sports betting solely among themselves for sports betting revenue. Similarly, bettors that make sports betting wagers with casinos only compete against the casino, and not against other bettors. This aspect limits the amount of the payouts and odds offered by the casinos.

Another common form of sports betting is through pick 'em groups, such as for the NFL season, involving friends. One example is an office pool. These groups generally are not regulated by state gambling authorities, even though pick 'em groups could technically be classified as sports betting. In these circumstances, members of the pick 'em group contribute a sum of money into a pool after selecting a series of teams that the player predicts will win for a certain period of time, such as a week. The amount of the pick 'em prize is limited by the size of the pick 'em group. The prize may be paid to the player who picks the most winning teams. Player ties are possible in pick 'em groups. The possibility of ties increases as the number of group members increases. Pick 'em groups may be common to football but not to basketball, hockey, or baseball.

No process exists through which bettors can make a sports bet and compete against an unlimited number of unrelated and unknown bettors for a prize amount that grows with each additional wager. All sports bettors have a considerable disadvantage against casinos that set the betting lines and payment odds for each wager, based on their special access to critical information sources for player status, algorithms, impactful game criteria, and the like. Casinos offer their betting lines based on information that may not be available to most sports bettors. No process exists through which bettors can make a combined sports bet relating to the point spread, money line, and over/under for a single wager. Further, no process exists through which a sports bettor is able to have a combined fantasy sports, lottery, and sports betting experience at the same time.

SUMMARY OF THE INVENTION

The disclosed embodiments eliminates the advantage that casinos have over the player and allow bettors to compete among themselves for a larger payout. The disclosed embodiments eliminate the advantage of the casino over a typical sports bettor by altering the relationship that the sports bettor has with the casino. Every casino must maintain a mathematical advantage over wagering sports bettors because casinos need to win more than their players to help them turn a profit to stay in business. Casinos do this so they can continue to deliver top-notch gambling options to their customers. When it comes to betting on sports, the odds are determined based on the chances of something happening, applying a variety of different factors. For example, a team winning a game outright or by a certain amount of points. To stay in business, sportsbook casinos reserve a percentage of betting proceeds. This commission is taken from the losing side of a wager.

The disclosed embodiments utilize a centralized casino to establish and maintain the betting lines independently from other casinos during the betting period. The requirement that the odds or the betting lines to be established and maintained by a single casino, based on that casino's existing sports betting activity, creates validity on how the point spreads, money lines, and over/under amounts are determined. The process used to establish and maintain betting lines is independent of and unrelated to the actions of the players. The betting lines offered to players are not impacted by the wagers made by the players themselves rather, the betting lines in the disclosed embodiments will fluctuate in relation to one casino's real-time sports betting wagers with their other customers wagering on sporting events.

All players are given the same amount of time and opportunity to make the wager with the same betting lines because other participating casinos are required to use the betting lines, such as point spreads, money lines, and over/under amounts, from one source. In other words, players making a wager at different casinos can be guaranteed that they will be given the same betting lines when the wagers are made at the same time, no matter which casino accepts the wager for the process. This feature reduces the opportunity for casinos to corrupt the process of determining a valid winner while still allowing unrelated casinos to participate in the process by accepting wagers from players.

Every casino that offers sports betting maintains their own experts and process for determining the betting lines for their customers, applying their own proprietary criteria through this process weighing each possible factor at their sole discretion. When the centralized casino generates the output of the betting lines to be used by the disclosed embodiments, these betting lines also are used for another, unrelated purpose, which is the sports betting wagers of their customers. The betting lines used for the process reflect the real-time betting lines offered to the casino's sports betting customers for sporting events. This data then is used to apply the point scoring algorithms to determine a winner among all players for the specific betting period.

BRIEF DESCRIPTION OF THE DRAWINGS

Various other features and attendant advantages of the present invention will be more fully appreciated as the same becomes better understood when considered in conjunction with the accompanying drawings.

DETAILED DESCRIPTION OF THE PREFERRED EMBODIMENTS

Figure 1:
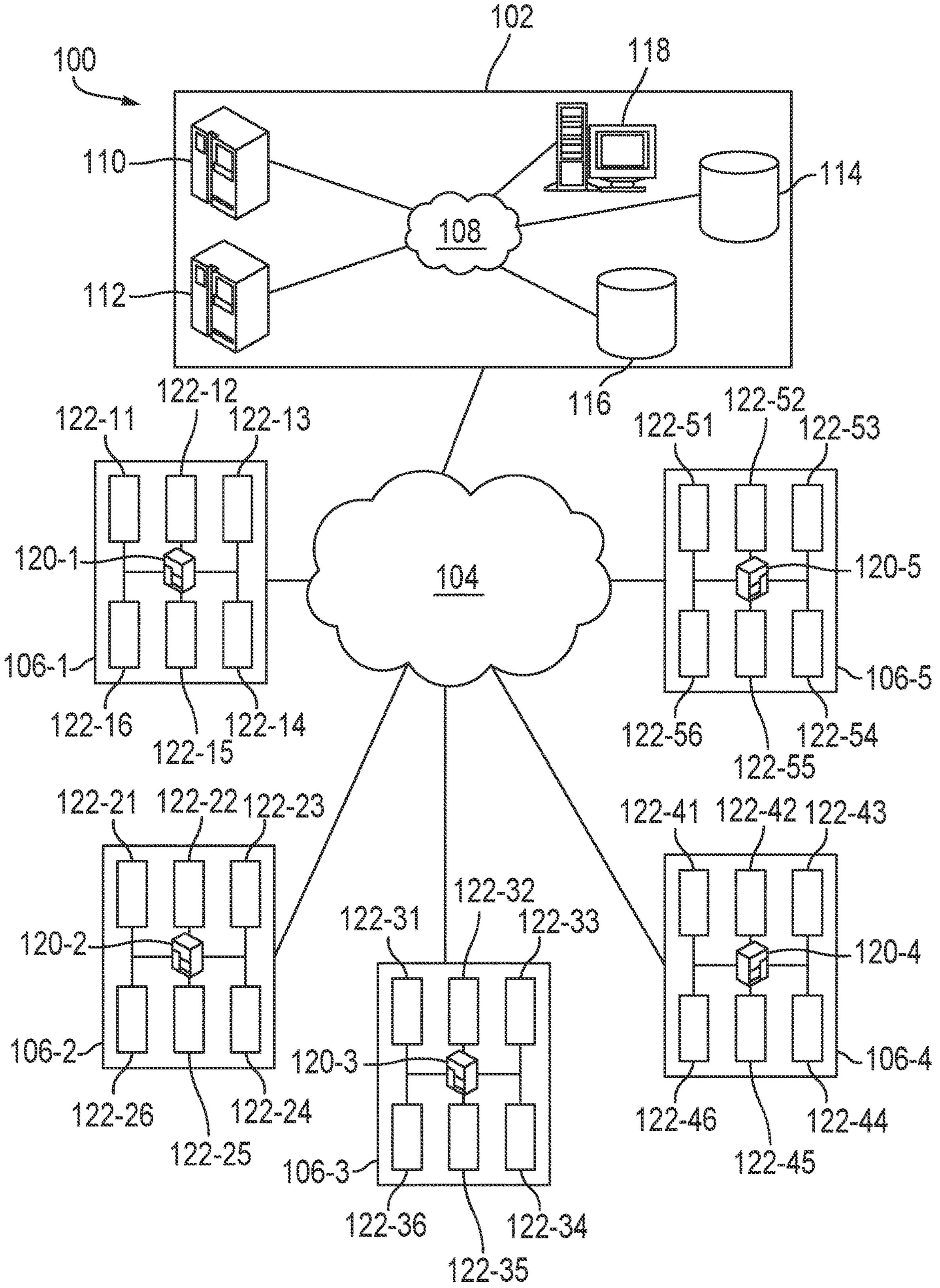
FIG. 1 illustrates a gaming network according to the disclosed embodiments.

Reference will now be made in detail to specific embodiments of the present invention. Examples of these embodiments are illustrated in the accompanying drawings. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments enable a process that allows for multiple sports bettors to compete against themselves. No discernable advantage is allowed across a sizeable pool of sports bettors with widely varying levels of sports betting experience, to encourage the average sports fan to try sports betting. The disclosed embodiments determine a winner of a sports bet that can be applied in the same manner across several different professional and college sports, such as football, basketball, hockey, and baseball, with slightly differing point calculation algorithms depending on the sport. The data is constantly changing based on the central casino. For example, the over/under on the first day of the playing period will likely be different than the over/under established by the central casino on the last day of the playing period. The betting lines are constantly changing for the central casino for purposes of the disclosed embodiments. Further, the betting lines are moving completely independent from the money related to the players' bets because the betting lines are reflecting the central casino's actual sportsbook criteria related to their betting action in real-time.

The disclosed embodiments combine three of the most typical sports betting actions into a single bet. These actions may be the point spread, the money line, and the over/under bets. These betting actions are combined into an easily understandable format for all experience levels of sports betting. The disclosed embodiments also allow many different sportsbooks to accept money for the same sport bet wager made by hundreds or thousands of players, on a coordinated basis with all the players playing one combined sports bet. The disclosed embodiments also allows many different sportsbooks to uniformly reference a specific point spread, money line, and over/under amount on a real time basis. The exact time and date of each bet entry is captured via a time stamp immediately prior to the sports bet as part of the disclosed embodiments. All participating casinos must reference the betting lines of one specified sportsbook at the time that all bets are made.

The disclosed embodiments allow a player to have a combined fantasy sports, lottery, and sports betting experience at the same time. The fantasy sports experience is provided because each team selected represents an amalgamated fantasy "player" that is awarded points dependent on how well the team performs in a particular sporting event. A lottery experience is provided because the players are only competing against themselves, as opposed to a casino, for a large pot of money that grows based on the number of betting entries for a particular week. A sports betting experience is provided because each wager directly involves the three most common sports bet made.

The disclosed embodiments significantly shift the financial risk for paying out a winning sports bet away from the casino and towards a pool of money generated by the players themselves. After the number of players reaches a certain point to account for the minimum guaranteed weekly payout to a winner, no casino will be at risk for the payment of any winning amount. The group of participating casinos will bear a minimum amount of risk to guarantee a minimum amount of payout until enough bets are made to cover the minimum guaranteed payout amount. This amount may be determined at a later date, but may initially be $100,000.

The disclosed embodiments provide for the winning sports bet amount to continue to grow exponentially with each additional entry or wager. A typical sports bet payout does not have a growing jackpot amount. Instead, the exact potential payout is determined when the bet is made. In contrast, the disclosed embodiments provide for a growing payout to the winner until betting concludes for the betting period and a winner is determined for such period.

The disclosed embodiments resemble a typical sports bet because it involves consideration of point spreads, money lines, and over/under amounts, which typically result in a lower payout to winners but result in more winners and only involves the player and the casino. The disclosed embodiments, however, allow for hundreds or thousands of unrelated bettors to pool their money in a coordinated and mutually agreed upon process that determines one winner in almost all circumstances, unlike pick 'em pool scenarios that have ties. The final tie breaker provides for the bet made first-in-time in relation to all other tied players to receive a winning preference over all others, rarely allowing for ties—which would only occur where tied players submit their bet at exactly the same time. In such cases, payouts are paid pro rata to any tied players after all tiebreakers are applied.

The disclosed embodiments uniquely combine aspects of luck and chance with the ordering of picks and timing of when a bet is made to play a significant role in determining a winner in the event of a tie. The disclosed embodiments may reduce any advantage that an experienced sports bettor may have over an average sports fan with little to no sports betting experience.

FIG. 1 depicts a gaming network 100 according to the disclosed embodiments. Gaming network 100 includes a host computer system 102 and communication network 104 through which a plurality of gaming locations 106 communicate with the host computer systems. Host computer system 102 includes an internal network 108, a web server 110, a game server 112, a game storage database 114, a player storage database 116, and an administrator computing device 118. In some embodiments, various components of host computer system 102 are located together or substantially near each other, such as in the same building. In other embodiments, host computer system 102 may be distributed in that various servers, databases, and devices are located separate from each other and connected through communication network 104. As can be appreciated, a single feature shown in host computer system 102 may actually be embodied by multiple entities. For example, game server 112 may include two or more servers that perform the functionality of the game server.

Gaming network 100 also includes gaming locations 106. Gaming location 106 may include a local server 120 and one or more player devices 122. In some embodiments, local server 120 facilitates communication between player devices 122 and host computer system 102. In other embodiments, local server 120 administers the matches, tracks players and selections, manages player deposits and payouts, and the like. Further, more than one server may act as the local server. These servers may be dedicated to different functions within gaming system 100, as disclosed below.

Gaming locations 106 also may be known as hubs or other terms that designate a local server 120 communicating with host computer system 102. In some embodiments, gaming locations may not be used, such that player devices 122 communicate directly with host computer system 102 to participate in matches and contests online. Further, users of player devices 122 are not prohibited from participating in matches with other users at other gaming locations.

An example process for participating in a gaming match or pool is provided below. Gaming location 106-1 may pertain to a geographical area, such as a zip code or county. Users in this location access a local server 120, usually an online access provider, to participate in gaming network 100. Player devices 122-11, 122-12, 122-13, 122-14, 122-15, and 122-16 are located in this area and associated with a user. Player devices may be computers, smartphones, tablets, gaming consoles, processing units, and the like. The users of these devices log onto gaming network 100 and place bets on the disclosed gaming process that relate to actual games and sporting events.

Another gaming location may be 106-4, which includes player devices 122-41, 122-42, 122-43, 122-44, 122-45, and 122-46. The users of these player devices also may participate in gaming network 100. Host computer system 102 may indicate online through communications network 104 that matches are being held related to, for example, a week of NFL or college football games. Users may participate in the disclosed embodiments by picking teams from these matches to complete their entry form. Thus, the users, for example, of player devices 122-16, 122-14, 122-53, 122-42, and 122-33 may participate in the pick 'em game described in the disclosed embodiments related to NFL or college football games. At the end of that week's games, one of the users associated with these devices will win, which results in financial compensation to that user. The winning amount may be sent to the user over communication network 104 using administrator computing device 118. The winner will be notified at his/her respective player device.

As can be appreciated, gaming network 100 is not limited to a specific location or group of users. A user in gaming location 106-1 may compete against those in gaming locations 106-2 or 106-5. Further, all matches and gaming events are centralized using host computer system 102. Friends and/or strangers from any location may participate in picking games from all available matches against each other through the pick 'em game described by the disclosed embodiments. Unlike "office pools," matches are conducted online and in real-time.

Figure 2:
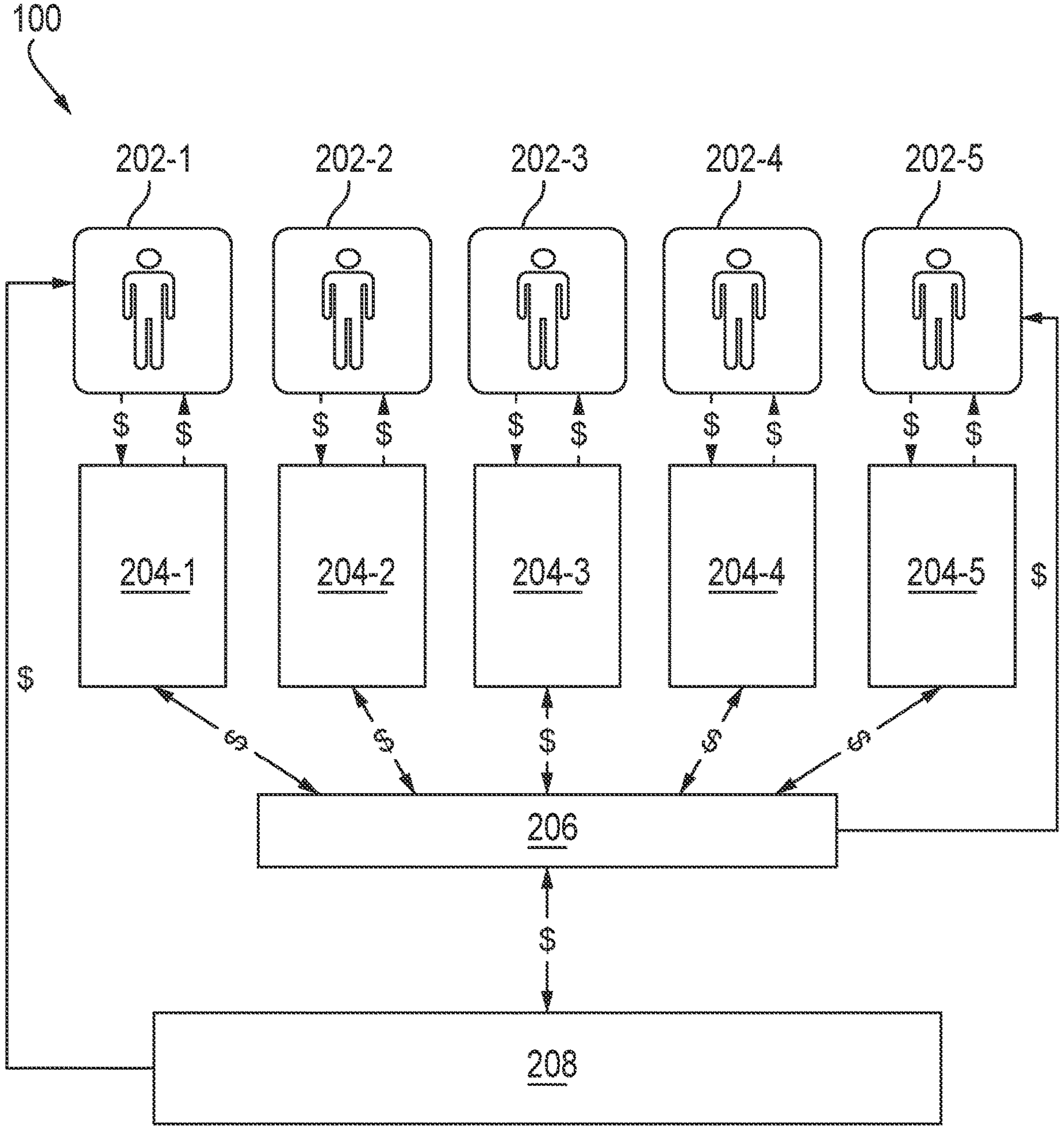
FIG. 2 illustrates the economic components of the gaming network according to the disclosed embodiments.

FIG. 2 depicts the economic components of gaming network 100 according to the disclosed embodiments. FIG. 2 shows the flow of funds within gaming network 100. Players 202 engage in gaming using devices 204. Players 202 may provide value, such as cash, points, credits, and the like, through devices 204 to engage in the games offered by host computer system 102. Host computer system 102 will provide matches, which players 202 will pick from to participate in the pick 'em contest according to the disclosed embodiments. When player 202-1 picks a winning team involved in a match within gaming network 100 as part of playing the pick 'em game described in the disclosed embodiments, device 204-1 is configured to calculate the player's points earned from that winning pick in real-time, as well as all other winning picks the player has made from the universe of matches available during each betting period.

Local depository 206 may receive and distribute funds to players 202. Local depository 206 may be connected to central depository 208, which controls the funds as pick 'em entries are completed by players picking from available matches during a betting period. Local depository 206 may relate to a location where players 202 are playing, even though devices 204 move. As players 202 and devices 204 move around, different local depositories 206 may interact with them to receive and distribute funds. In some embodiments, value is paid from a local depository 206 to central depository and vice versa. In other embodiments, central depository 208 may pay funds directly to players 202.

In alternative embodiments, local depository 206 may correspond to a fixed location within a business establishment, such as a casino. Gaming network 100 may have a direct relationship with the casino to promote a particular pick 'em game described by the disclosed embodiments for a specific sport, while providing special offers to players 202 using gaming network 100 through the casino. For example, players using local depository 206 at the casino may receive reduced entry fees to pick 'em entries or access to a greater number of sports and available matches than players outside the casino. Meanwhile, the casino may pay for use of local depository 206. Local depository 206 confirms the location and status of players 202 to receive these benefits as well as providing real-time feedback to the casino. Central depository 208, however, still controls all receipts and payouts in gaming network 100.

Figure 3:
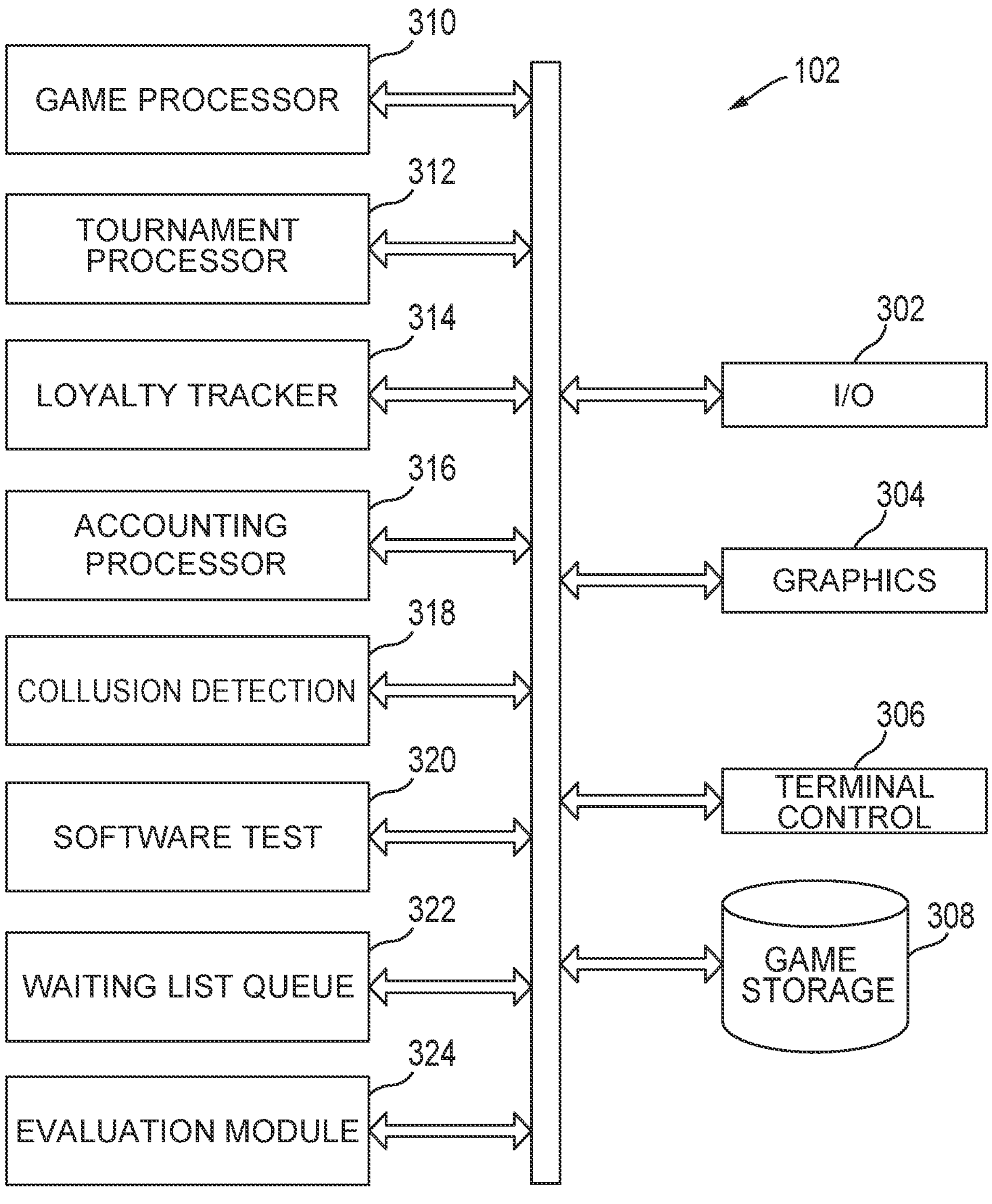
FIG. 3 illustrates an example of a host computer system according to the disclosed embodiments.

FIG. 3 depicts an example of a host computer system 102 according to the disclosed embodiments. FIG. 3 shows several program modules as well as computer functions that configure host computer system 102 into a special purpose machine. I/O module 302 handles input to and output from a processing environment or communication network 104. Graphics module 304 provides control over the graphics displayed on devices, computers, administrative terminals, and the like. Terminal control module 306 provides the capability of host computer system 102 to interact with or control a player device within gaming network 100. Game storage arrangement 308 stores software or other computer-executable code that controls the games or matches offered over gaming network 100.

A game processor 310 may control one or more matches or games using the computer executable code from game storage arrangement 308. A tournament processor 312 performs a similar function for possible tournaments. A loyalty tracker 314 keeps information about the participation of registered players to thereby reward players for the number of matches or amount of time they spend using gaming network 100. An accounting processor 316 may control the flow of funds or other forms of value within gaming network 100. A collusion detection processor 318 monitors such occurrences as unusual action taken by a specific player, frequent violations of gaming rules, fraud or attempted fraud, and the like.

A software test environment allows new games, matches, or processes to be tested in an environment that does not affect ongoing operations. This may be especially important to not disrupt ongoing matches within gaming network 100. As can be appreciated, matches related to sporting events may occur around the clock as the matches are not limited by time zone or location. A waiting list queue 322 allows players to wait in line for a specific match, sport, and the like until the point spread, moneyline, and over/under amounts are set by the central casino. Unlike NFL and college football games, the betting lines for basketball, hockey, and baseball are not determined by the central casino until the day of the game. For example, players may wish to participate in the pick 'em game according to the disclosed embodiments by picking a team in a baseball game between two fierce rivals. As the betting lines are determined by the central casino, players are notified of available matches to pick from, as matches are released from queue 322. An evaluation module 324 allows for the monitoring of the communication latency between the devices of the players and host computer system 102.

Figure 4:
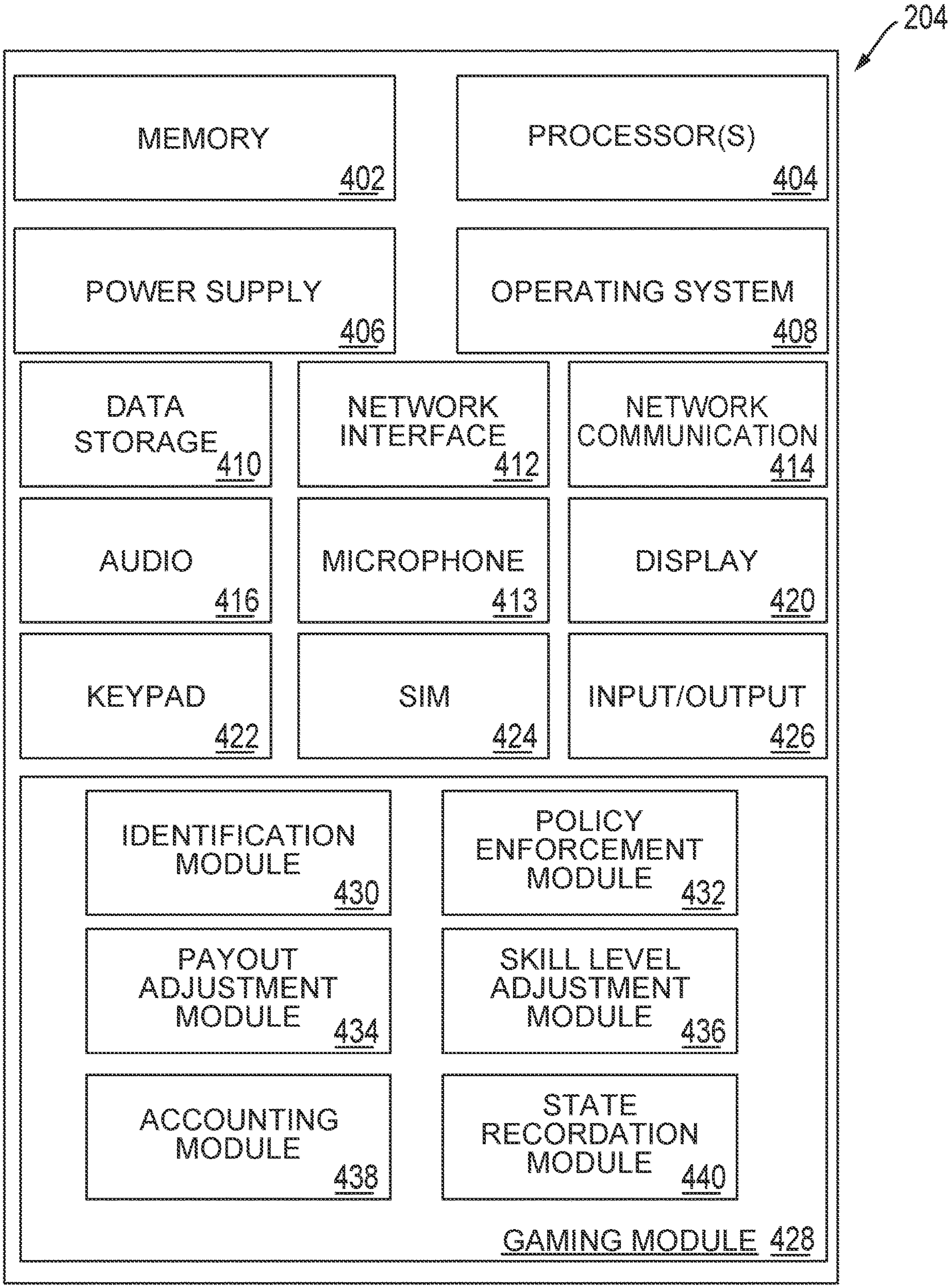
FIG. 4 illustrates components of a device used by a player within the gaming network according to the disclosed embodiments.

FIG. 4 depicts components of a device 204 used by a player 202 within gaming network 100 according to the disclosed embodiments. Device 204 may be a computing device that hosts various applications and programs. In some embodiments, device 204 is configured to become a special purpose machine to implement a gaming module 428 to use within gaming network 100.

Device 204 includes memory 402, such as volatile memory or nonvolatile memory, processor(s) 404, power supply, or battery, 406, and operating system 408 for executing instructions. Additional components may include data storage component 410, such as a hard drive, a flash drive or memory, a memory card, and the like, one or more network interfaces 412, and network communication interface 414, which enables device 204 to communicate by transmitting and receiving wired and wireless signals over networks, audio interface 416, SIM card 424, other input or output interfaces 426, and gaming module 428. The components shown therein may be connected by a bus.

Memory 402 may be used to store instructions for running one or more applications or modules on at least one processor 404. For example, memory 402 could be used in one or more embodiments to store all or some of the instructions needed to execute the functionality of the various system components or modules. One or more processors are the main processors of device 204, which may include application processors, baseband processors, various coprocessors, and other dedicated processors for operating device 204. An application processor may provide the processing power to support software applications, memory management, graphics processing, and multimedia functions. An application processor may by communicably coupled with memory 402 and configured to execute operating system 408, a user interface, and the applications stored on memory 402 or data storage component 410.

A baseband processor may be configured to perform signal processing and implement/manage real-time radio transmission operations of a device, such as a mobile device. These processors, along with the other components, may be powered by power supply 406. The volatile and nonvolatile memories found the various embodiments may include storage media for storing information, such as processor-readable instructions, data structures, program modules, and other data. Some examples of information that may be stored include basic input/output systems (BIOS), operating systems, and applications. Operating system 408 may provide common services for software applications executing on one or more processors 404.

Gaming module 428 may include identification module 430, policy enforcement module 432, payout adjustment module 434, skill level adjustment module 436, accounting module 438, and state recordation module 440. Each of these modules can be embodied as special-purpose hardware or as programmable circuitry, such as one or more processors, appropriately programmed with software or firmware, or as a combination of special purpose hardware and programmable circuitry.

Identification module 430 may be used to gather information about the device, current or past gaming sessions, player information, specific hardware, and software configurations of the device, GPS coordinates, associated telephone numbers, IP addresses, email addresses, user identifiers, international mobile station equipment identity (IMEI), mobile equipment identifiers (MEID), integrated circuit card identifiers (ICCID), part identifiers, software identifiers, current gaming or match session identifiers, identification of nearby player devices, and the like. This information may be used in variety of ways, including policy enforcement module 432 that can set customized collusion avoidance policies that can, in some embodiments, be dynamically set, based on location, current gaming session, and the like.

Payout adjustment module 434 may be used to dynamically adjust the payout of a particular pick 'em game according to the disclosed embodiments. For example, there may be minimum payout requirements for certain pick 'em games based on a particular sport. Payout adjustment module 434 may ensure that winnings are provided as soon as possible to players so that there is no lag or delay associated with other online gambling platforms. Payout adjustment module 434 also may adjust the payout based on rules associated with a particular pick 'em game according to the disclosed embodiments. For example, some pick 'em games may take a fee or percentage from the money involved in the pick 'em game. Using the example, there may be a 1% fee to cover processing and overhead for conducting the pick 'em game according to the disclosed embodiments. The percentage may be different depending on the location of the player, the sporting event involved in the pick 'em game, or other factors.

Skill level adjustment module 436 may be used to adjust playing parameters for pick 'em games according to the disclosed embodiments. For example, the higher the skill level, then the less a player may be allowed to participate in a pick 'em game that includes novice or casual players. Alternatively, one who is more experienced with picking winning teams based on point spreads, moneylines, and over/under bets can be directed to access additional or higher stakes pick 'em games according to the disclosed embodiments. Accounting module 438 may be used to interface with various existing backend accounting systems, reporting systems, and record keeping systems. In some embodiments, accounting module 438 may be used to implement procedures that are designed to detect and prevent transactions that may be associated with money laundering, fraud or other criminal activities, and to ensure compliance with all federal and state laws.

State recordation module 440 may be used to capture the state of a match. The "state" may include a variety of game states including wagers, payout levels, skill level settings, and others. The state of the gaming session may be repeatedly captured so that in the event of a communication failure, device fault, or the problem, a record of the current state may be reconstructed. For example, the state may be captured every second or depending on pick 'em game dynamics. The state captured by state recordation module 440 also may be used by a collusion avoidance module to determine if any collusion is occurring. The state information captured by state recordation module 440 may be used to generate various game and match analytics. Host computer system 102 may capture the state information directly from the device.

State recordation module 440 may store the state information in a database for regulatory compliance, analytics, or other purposes. For example, all game play within a period of time may be recorded and stored in the database. In other embodiments, a limited number of gaming sessions may be recorded, such as the last one hundred matches. Other embodiments may include state recordation module 440 recording state information for pick 'em games according to the disclosed embodiments that generate wagers over a set threshold, such as $1000.

In some embodiments, the devices used by the players to access gaming network 100 may provide for social media, chatting, and other communication channels. For example, some embodiments may have interfaces that allow for third party access through another gateway, such as Facebook™ or other social media platforms. Some embodiments of the devices may allow for picture in picture or multiple screens. As matches are occurring, a player may talk with other players in the pick 'em game according to the disclosed embodiments and share opinion about the play of the teams.

Figure 5:
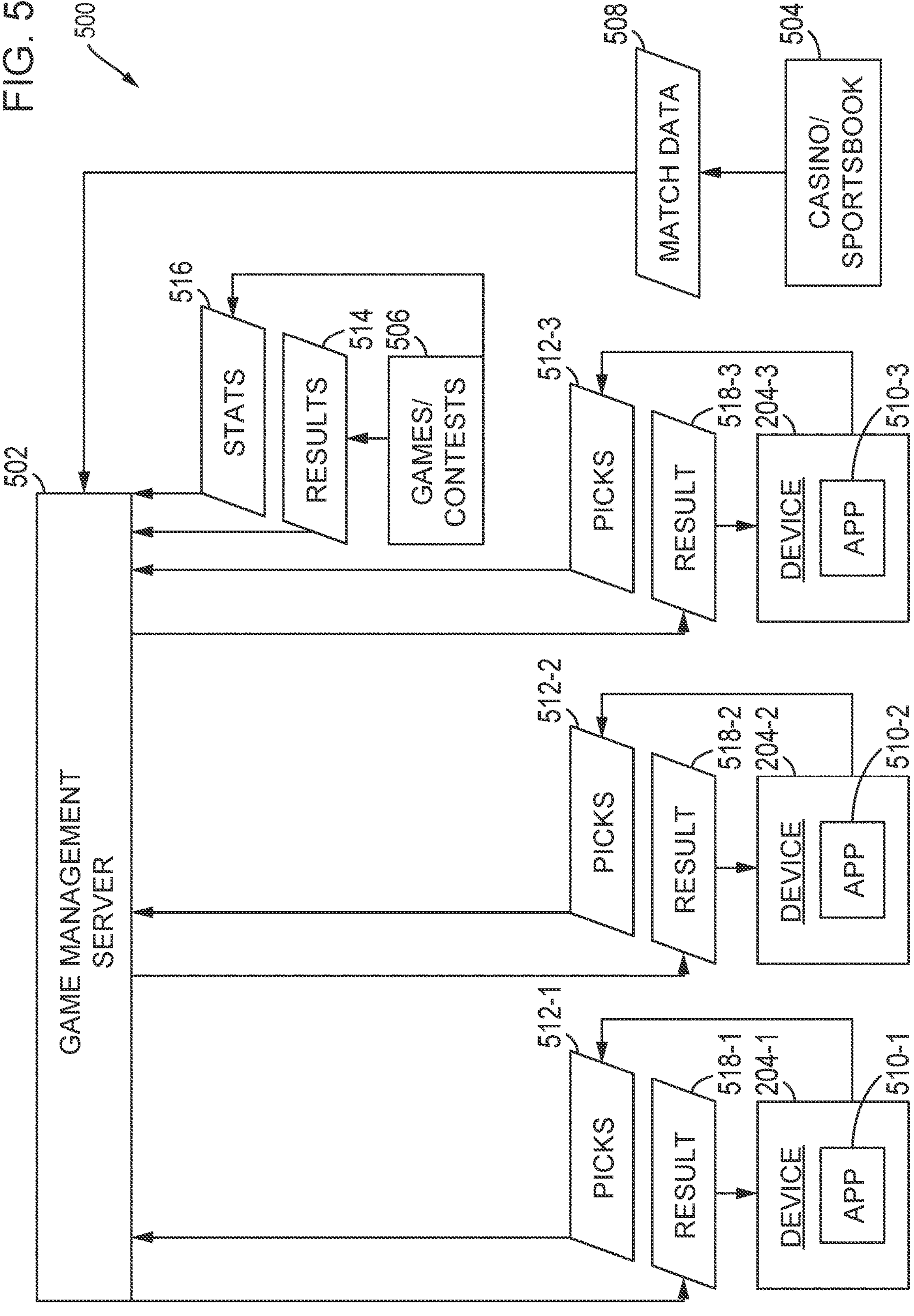
FIG. 5 illustrates a gaming network for participating and resolving matches according to the disclosed embodiments.

FIG. 5 depicts a gaming network 500 for participating and resolving matches, calculating point scoring for each player's pick 'em entry form according to the disclosed embodiments. Gaming network 500 includes a game management server 502. Game management server 502 may control the receipt of data and information from the various components within gaming network 500. Game management server 502 also executes the processes to determine scores, rankings, winners, and other outcomes related to the matches that are involved in specific pick 'em games. Game management server 502 may work in conjunction with system 100 to receive payments and distribute winnings as a result of matches and point calculation for each player's pick 'em entry form according to the disclosed embodiments.

Gaming management server 502 is connected to central casino, or sportsbook, 504. More than one casino may participate in any pick 'em games and submitting wagers according to the disclosed embodiments, but one central casino will be responsible for providing match data, including the betting lines for point spread, moneyline, and over/under amounts 508 to game management server 502. Match data 508 will be used to determine outcomes for matches and will also calculate the points scored by players that pick the winning team in each pick 'em game. Match and pick 'em game data 508 is disclosed in greater detail in FIG. 6 below. Match and pick 'em game data 508 may be sent to game management server 502 on a regular basis, such as daily, as lines and odds change over time.

Gaming network 500 also includes devices, such as device 204, that communicate with game management server 502 to place wagers, make picks, view results, and the like. Thus, device 204-1 may include application 510-1 that allows a player to participate in a pick 'em game according to the disclosed embodiments. A "match" within a pick 'em game is disclosed in greater detail below. Using application 510-1 on device 204-1, a player may submit picks 512-1 for the pick 'em game. Winning picks include winners of various point spread picks, money line picks, and over/under picks. Valid pick 'em game entry forms also includes a date and time stamp that the information is received sent by device 204-1. Alternatively, game management server 502 may add the date and time stamp to pick 'em entry forms 512-1 when received.

The same actions may be taken by devices 204-2 and 204-3. A player using device 204-2 may review match information and submit team picks using match information 512-2 for any specific pick 'em game according to the disclosed embodiments. A player using device 204-3 may review match information and submit picks 512-3 for the match as part of the pick 'em game involved. As noted above, pick 'em game entries include a date time stamp to differentiate when pick 'em game entries are submitted. For example, pick 'em game entry 512-2 may be received before pick 'em game entry 512-1, which is received before pick 'em game entry 512-3. Further, pick 'em game entries according to the disclosed embodiments are to be matched against the pick 'em game entries data 508 applicable for the date and time the pick 'em game entry is received by a participating casino. For example, if an over/under amount changes for a match related to a particular pick 'em game, then the time of when the pick 'em game entry is received by a participating casino, including the central casino, becomes important. Game management server 502 tracks this information within gaming network 500.

A pick 'em game according to the disclosed embodiments may be a series of games that are played over a period of time. For example, an NFL "week" may include Thursday night games, Saturday and Sunday games, and Monday night games. The same applies for college football "weeks" that may include games on similar days throughout any given week. For basketball, baseball, or hockey, a pick 'em game may be limited to games being played on a single day because the point spread, moneyline, and over/under betting lines are not announced until the day of the sporting match. In any event, games are played with winners, losers, and statistics being generated as a result for every team picked in a pick 'em game entry submitted by players. These results are then used to determine whether players won or lost the pick 'em game based on their picks.

Thus, games, or contests, 506 are played. After completion of the last sporting match in the betting period of a pick 'em game, results 514 and statistics 516 are generated and provided to game management server 502. Preferably, results 514 and statistics 516 are provided by the central casino that maintains a sportsbook. These items may be provided by the central casino to all participating casinos and players. The exact values for statistics 516 are very important in the process of determining the winner of a pick 'em game.

Game management server 502 calculates scores according to the disclosed embodiments, as set forth in greater detail below. Appendix A as provided shows a detailed explanation of how the pick 'em game works and results determined as to a winner. Game management server 502 then sends result 518-1 to device 204-1, result 518-2 to device 204-2, and result 518-3 to device 204-3. Players may view their results. Game management server 502 also may authorize system 100 to make payment to the winner of the pick 'em game.

Some features make gaming network 500 different from other gambling or sports entertainment systems. Pick 'em game 508, which includes point spread, money line, and over/under amounts, must be determined and maintained in real-time by one specific sportsbook repository, or central casino 504. Game management server 502 is not dependent on various casinos or sportsbooks accepting wagers. All participating casinos accepting wagers and picks from players do not compete against each other. Instead, the casinos and sportsbooks accept pick 'em game entries from players that choose to complete among themselves for an aggregated sum of winnings.

For example, device 204-1 may be associated with a second casino different from casino 504. In fact, "device" 204-1 may be another casino that submits a plurality of picks 512-1 to game management server 502. Device 204-2 may be associated with casino 504 while device 204-3 is associated with a third casino. Many casinos and sportsbooks run their own applications so that each device is using a different casino application. Despite being from different casinos, players may come together and compete in the disclosed pick 'em game.

All point scoring and in-game statistics, such as offensive yards, points or runs or goals, defensive statistics, and the like, for all games in multiple sports must be collected and maintained in real-time by one specific sportsbook repository to maintain uniformity and integrity amount all participating casinos which includes the central casino. Thus, game management server 502 receives this information. Reference to a "specific sportsbook repository" may refer to game management server 502.

Each pick 'em game entry must maintain a date and time stamp to determine a winner in the event of a tie, after points are calculated via the applicable algorithm, which is determined by one specific sportsbook repository, or game management server 502. All participating casinos must be provided real-time point spreads, money lines, and over/under amount, such as those within match data 508 with a corresponding date and time stamp so that the most current betting lines of the central casino are provided to devices 204-1, 204-2, and 204-3 at the time that a pick 'em game entry, or picks 512-1, 512-2, and 512-3, respectively, are submitted to a participating casino. The exact time that a wager, or pick 'em game entry, is made determines a winner in the event of a tie. All of match data 508 is subject to change depending on the determination by one specific sportsbook repository.

The point calculation algorithms are calculated immediately after dozens of sporting events, or games/contests, 506 conclude in order to update hundreds or thousands of players' scores in real-time by one specific sportsbook repository. The names and identifying information for each bet made by hundreds or thousands of players, including possible payouts, must be collected and maintained by one specific sportsbook repository, such as game management server 502. This feature will allow several different unrelated casinos to immediately recognize an individual as a registered player on a uniform betting platform. Players that make bets through a participating casino's website or application, such as applications 510-1, 510-2, and 510-3, will be identified and allocated to that specific casino to determine that casino's participation fee related to generating the wager or pick 'em game entry. This feature provides financial incentive to participating casinos to market the pick 'em games across a variety of different professional and college sports to their own sports betting customers and continue to increase the number of wagers, or pick 'em game entries, processed through their efforts.

Each participating casino will be responsible for properly geo-locating and confirming the validity and legality of each wager accepted in real-time as each wager is made. A wager includes the submission of a valid pick 'em game entry by a player. This may only be done via a computer or application prior to accepting payment and finalizing a valid wager or pick 'em game entry. Hundreds and thousands of pick 'em game entries accepted by multiple participating casinos, unrelated to each other, will be required to be shared in real-time among all the participating casinos so they can monitor how many entries are taken by any particular casino, when the pick 'em game entries are made, and individuals are making these wagers through other casinos. This feature provides for transparency among all participating casinos and requires a computer-assisted coordination of information.

All participating casinos will be able to access the most current player data from a centralized database, such as game management server 502. This information may include registered players, how many wagers are accepted by each casino, when a participating casino accepts a wager, or picks, and the like. Data storage must occur in a centralized location such as game management server 502. All valid pick 'em game entries or wagers, originating from multiple states on a likely simultaneous basis during a betting period, must be accurately accounted for in a verifiable and secure manner for regulatory purposes, which requires data manipulation, calculation, and storage that goes well beyond human capabilities and may necessitate artificial intelligence.

Figure 6:
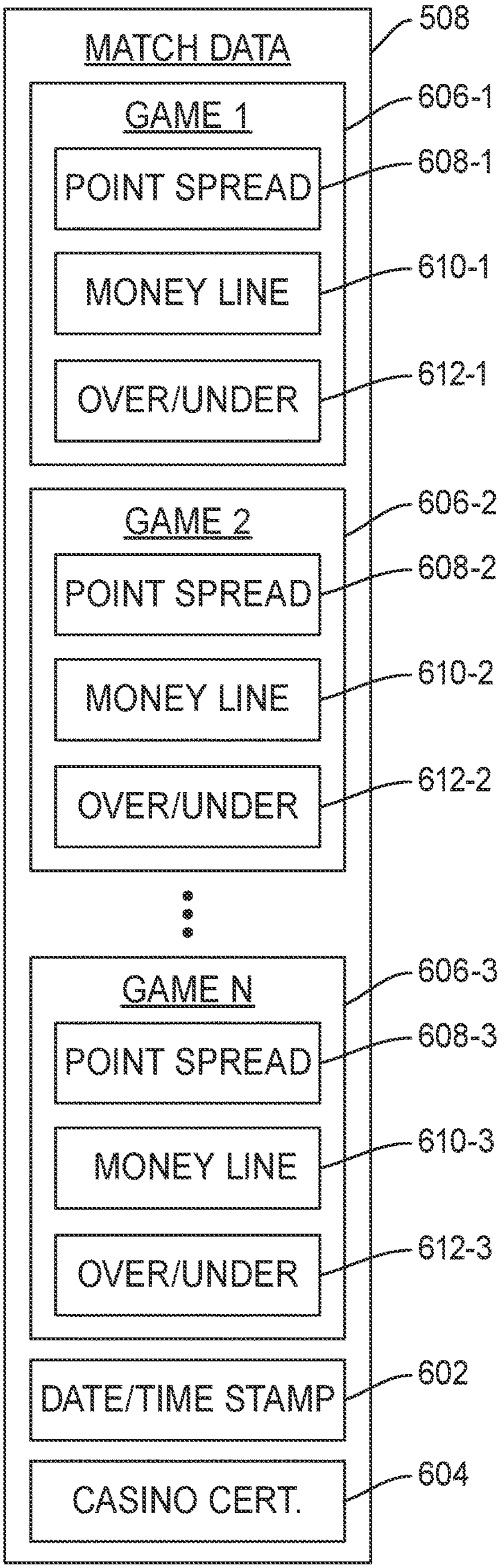
FIG. 6 illustrates a block diagram of match data for a match, or betting period, according to the disclosed embodiments.

FIG. 6 depicts a block diagram of match data 508 for a pick 'em game, or betting period, according to the disclosed embodiments. As disclosed above, match data 508 is generated in a periodic basis, such as daily or even hourly, from casino, or sportbook, 504. As made clear above, gaming network 500 only uses one casino 504 to generate match data 508. This feature is important for consistency and legitimacy of the results of a match and ultimately the results of the calculations for all pick 'em game players. Gaming network 500 needs to be able to refer to a single point of reference in terms of the data provided for the betting period for each pick 'em game across a variety of professional and college sports.

Match data 508 includes date and time stamp 602. Date and time stamp 602 are very important for pick 'em game entries. As disclosed below, the date and time of received pick 'em game entries may be used to determine the winner in the event of a tie. The date and time of the match data, such as point spreads, money lines, and over/under amounts will then depend on when the pick 'em game entry is validly submitted to the gaming network 500. The exact values for these items are used in calculating a total point score for the players. Further, the values for match data 508 varies depending on several factors, as disclosed above. A point spread for a game may differ from one day to the next. A certified, verifiable time of match data 508 is critical so that the wrong values are not used in the computational processes for pick 'em game point scoring.

Casino 504 and game management server 502, therefore, must use metadata associated with data and time stamp 602 done by a computer to provide this level of verification. With hundreds and thousands of players across different time zones and locations, the veracity of when match data 508 is generated and received is critical. Further, the most up to date betting information regarding the sporting matches subject to a particular pick 'em game also is critical so players can make informed decisions when placing picks for the pick 'em game they intend to play.

Match data 508 also includes casino certification 604. Casino certification 604 may be metadata added to match data 508, such as a key, that is recognizable by game management server 502 that the match data is legitimate. Security protocols may be in place to prevent improper data from being delivered to game management server 502.

Match data 508 also includes game data for a match, or the betting period related to a particular pick 'em game. For example, 12 games, or sporting contests, may be involved in a particular betting period. These 12 games may involve 24 different teams playing over the course of a day, weekend, week, and the like. Each game will have match data that is associated with that specific game. Thus, game 606-1 will have point spread 608-1, money line 610-1, and over/under amount 612-1. These values are specific to game 1 and no other games. These values also may vary depending on variables related to game 1, such as weather, player status, normal betting activity within casino 504, and the like.

There is no limit to the amount of players that can participate in a pick 'em game for a betting period, which includes all matches within the same sport being played within the betting period of the related pick 'em game. There is also no limit to the number of pick 'em game entries that can be submitted by a single player. Before each betting period, each game is assigned a point spread between teams playing in the game. Underdog teams also are assigned a money line amount in addition to a point spread. Each game also is assigned an over/under amount. A player may pick whether a total score or statistical category will be above or under the amount and make that over/under pick within their pick 'em game entry.

Match data 508 also includes game 606-2, or game 2, that includes its own specific match data. Thus, game 606-2 includes point spread 608-2, money line 610-2, and over/under amount 612-2. These values also may vary depending on the situation with game 2. Factors influencing the match data for game 1 have no bearing on the match data for game 2. Game 606-3, or game N, may represent the final game in the betting period. Using the example above, it may be game 12. The disclosed embodiments are not limited to 12 games per pick 'em game. Game 606-3 includes point spread 608-3, money line 610-3, and over/under amount 612-3. Again, the factors associated with game N influence the values for the match data and players make their picks for their pick 'em game entries based on the most current match data.

It should be noted that match data for games may include other values for players to select. The ones shown are the most prominent used by casinos to receive bets on sporting events.

As can be appreciated, each game includes data that may vary over time. This data must be updated in real-time and use certifications within gaming network 500 to ensure winners of each game are selected properly. Casino 504 uses its own computer networks to update the match data then provides it to game management server 502. Casino 504 does not provide match data 508 directly to players through applications. Players may not have any relationship with casino 504. Further, as noted above, several casinos may receive pick 'em game entries based on match data 508. Those entities will process the pick 'em game entries directly received from players through game management server 502 to ensure that casino 504 is not directly involved in determining winners. This feature removes any suspicion that casino 504 is favoring its own sports betting customers. Moreover, casino 504 cannot promote the pick 'em game or gaming network 500 as its "own" proprietary platform. This feature allows the maximum number of players to participate for greater payouts as game management server 502 may coordinate the pick 'em games between several unrelated casinos and entities.

Figure 7:
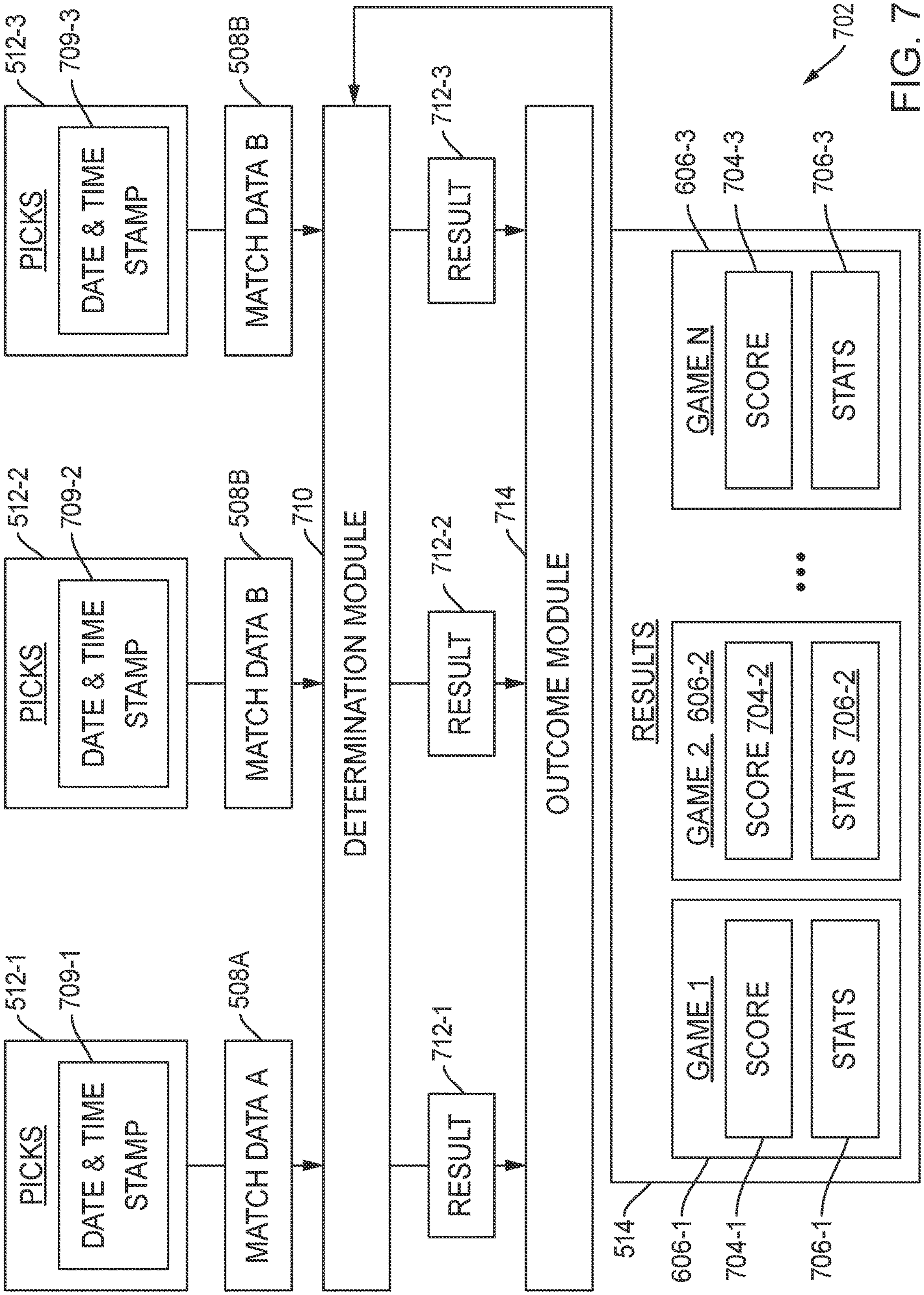
FIG. 7 illustrates a match resolution module within game management server according to the disclosed embodiments.

FIG. 7 depicts a match resolution module 702 within game management server 502 according to the disclosed embodiments. After each sporting match or contest, within a pick 'em game betting period, concludes, each team will be evaluated to determine if the team scored enough points to win the applicable sporting contest after applying the corresponding point spread. Winning teams are awarded point spread game points based on how much the winning team scores in excess of the applicable point spread for that match related to that player's pick 'em game entry. Moneyline game points for teams that have been assigned a moneyline will be awarded to underdog teams that win their sporting contest outright, disregarding the point spread and will be calculated using the moneyline processing algorithm. Similarly, moneyline game points will be awarded if the player picks a team based on the moneyline pick, based on the amount of points the underdog beats the favored team by in the match. For purposes of determining a winner of the pick 'em game for a betting period, a player may (1) pick a team based on either the point spread or the moneyline, and (2) pick the over or under amount for each match that is included within the player's pick 'em game entry.

All sporting contests also will be evaluated to determine if the total amount of points scored in the sporting contest was either over or under the applicable over/under amount for the game. Players that make a correct over/under selection will receive additional game points.

Referring to match resolution module 702, results 514 of a match, or all pick 'em game entries within a betting period, are received by game management server 502. Results 514 include the data needed to make the determinations disclosed above with regard to the point spread, money line, and over/under amount. Thus, referring back to the data in match data 508, game 606-1 may related to game 1 and includes score 704-1 and statistics 706-1 for the game. Statistics depend on the type of sport being played. For example, football games may include offensive and/or defensive team statistics, such as total yards, passing yards, rushing yards, takeaways, sacks, and the like. Basketball statistics may include total points, rebounds, assists, steals, turnovers, and the like.

Game 606-2 will include its own score 704-2 and statistics 706-2. Game 606-3 will includes its own score 704-3 and statistics 706-3. Much like match data 508, scores and statistics must come from a verifiable and trusted source. It also should come from a single source which will be the central casino or game management server 502. Results 514, therefore, also should be time stamped and verified upon receipt by game management server 502. It should be noted that the leagues at times after the games change statistics. For example, a passing play may be changed to a rushing play. Receipt of results 514 by game management server 502 provides certainty of the results against later changes.

Results 514 are then provided within module 702 to determine the results for the players participating in the gaming platform. Game management server 502 provides the picks or selections made by the players in their pick 'em game entries. Thus, picks 512-1 from the player of device 204-1, picks 512-2 from the player of device 204-2, and picks 512-3 from the player of device 204-3 are provided along with the associated match data that was applicable when the pick 'em game entries were received at game management server 502 or made at the respective devices.

Pick 'em game entries also may be associated with the real-time match data when the picks were made. As disclosed above, match data 508 changes over time, whether hourly, daily, weekly or the like. Thus, the match data applicable at the time the picks were made is important. For example, picks 512-1 may correspond to match data 508A while picks 512-2 and 512-3 may correspond to match data 508B, which are dated later than match data 508A. In match data 508B, some of the point spreads, money lines, or over/under amounts may differ from the ones in match data 508A.

Each pick 'em game entry includes its own date and time stamp that identifies the proper match data to associate with the pick 'em game entry. Pick 'em game entry 512-1 receives date and time stamp 709-1. Pick 'em game entry 512-2 receives date and time stamp 709-2. Pick 'em game entry 512-3 receives date and time stamp 709-3. Match data 508A is associated with the time period of date and time stamp 709-1 while match data 508B is associated with the time period of data and time stamps 709-2 and 709-3. This cross-reference feature ensures the proper match data is applied for the pick 'em game entries by the players.

Results 514, the pick 'em game entry from the players, and the corresponding match data are provided to determination module(s) 710. Each pick 'em game group may have its own determination module, or there may be a single determination module 710 that processes the data from the pick 'em game entries and results to determine an outcome for the match and ultimately the winner of the pick 'em game for the related betting period. Determination module 710 applies the process disclosed below on calculating a score based on the results and the picks. Determination module 710 does more than just determine how well the picks did based on the scores. It applies various weights and factors to modify scores accordingly. An example of this process may be found in the attached Appendix A.

After executing the disclosed processes, determination module 710 generates a result for each set of picks. This result may be the player's "score" used in determining a winner of the match. Thus, picks 512-1 receive results 712-1, picks 512-2 receive results 712-2, and picks 512-3 receive results 712-3. Preferably, the scores within the results vary enough that a clear winner emerges after taking all results and data into account. Results 712-1, 712-2, and 712-3 are provided to outcome module 714 to initiate a payout event. Outcome module 714 to rank the results to provide a top ten or any other ranking desired within gaming network 500.

The disclosed embodiments allow hundreds or may be thousands of players to submit a pick 'em game entry on a set of games or matches. Unlike normal sports betting at casinos, the players are not limited in their winnings because the payout for the winner of a pick 'em game will continue to grow as more and more players submit valid pick 'em game entries during the betting period. A $10 bet may result in several thousand dollars in winnings as many different players submit pick 'em game entries. With 12 different games, many different combinations may be received in the picks to distinguish them from each other. Further, the variable numbers for match data further provide different results. The results of the point spread, money line, and over/under amount may be multiplied by factors related to the statistics to further modify the score for picks. The disclosed embodiments, as disclosed below, include further tie-breakers in the event there is still a tie.

Figure 8:
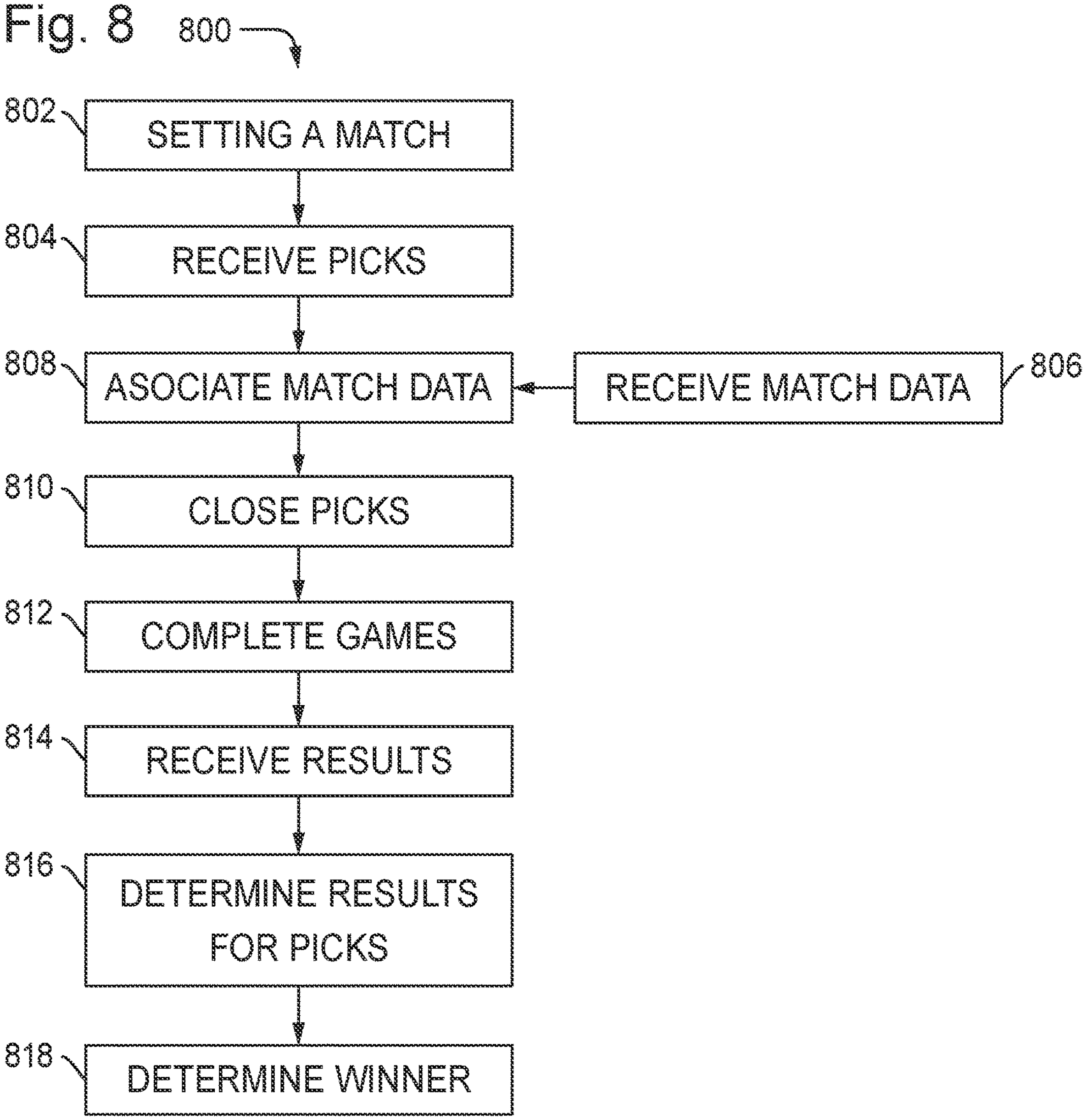
FIG. 8 illustrates a flowchart for using gaming network to engage in a pick 'em game according to the disclosed embodiments.

FIG. 8 depicts a flowchart 800 for using gaming network 500 to engage in a pick 'em game according to the disclosed embodiments. Flowchart 800 may refer to FIGS. 1-7 are illustrative purposes. Flowchart 800, however, is not limited to the embodiments disclosed by FIGS. 1-7.

Step 802 executes by setting a match of games or contests. As disclosed above, several games may be included in a pick 'em game. Further, the length of the betting period of a pick 'em game may be set, such as a week or a day. Games are listed along with the appropriate point spreads, money lines, and over/under amounts. Step 804 executes by receiving pick 'em game entries from players using devices or applications. Picks within a pick 'em game entry include winners of games based on the point spread or the moneyline pick, and an over or an under pick.

Step 806 executes by receiving match data 508 from casino 504. This data may be received at specific times, depending on demand, changes in the lines or amounts, and the like. Step 808 executes by associating match data with the picks within a particular pick 'em game entry depending on when the picks were made or received. Different values for the match data may be associated with the different picks.

Step 810 executes by closing picks for the pick 'em game betting period. This closure may occur, for example, 5 minutes before the first game of the pick 'em game betting period. Using a football example, step 810 may execute 5 minutes prior to kickoff of the Thursday night game. The number of players is closed as well. Step 812 executes by completing the games. Games or contests are played. Preferably, the players in the match enjoy watching the games and cheering for their picks.

Step 814 executes by receiving results 514 from the games after they are all completed. Results 514 include scores and statistics for each game. Results are received at game management server 502. Step 816 executes by determining the results of the picks in view of the scores and statistics. Each set of picks in each pick 'em game entry is compared against the results to calculate a score. Step 818 executes by determining a winner or ranking based on the results determined for each set of picks using the picks and scores plus statistics.

Below is a detailed explanation of the scoring algorithm to determine winners and results. The processes disclosed below may be incorporated by game management service 502 into module 702. For each betting period in a pick 'em game, there will be a certain number of matches available, with point spreads, moneylines, and over/under amounts displayed for players to consider. Players will be asked to pick a number of teams, from the universe of available matches, that they think will win after the stated point spread is applied, or players may instead pick an underdog team to win outright on a moneyline pick. The risk of picking an underdog to win on a moneyline pick is rewarded by the potential of scoring more points than the point spread pick would generate. In each match a player picks a team on either a point spread or moneyline basis, the player must also pick the over or under amount for that match. After all matches in a betting period are completed, a player will score points for every winning pick made related to the applicable point spread or an outright win for the underdog on a moneyline pick. Players will only receive points for winning point spread picks or moneyline picks. Players will receive additional points if their winning pick not only covers the point spread but beats the point spread, the more a team beats the point spread the more points are scored for the player. Similarly, if a moneyline pick wins outright, players will receive additional points based on how much the underdog beats the favorite, the larger the margin of victory for the underdog in a winning moneyline pick, the more points are scored for the player. After all the points are calculated for a player's winning point spread picks and/or moneyline picks, this point total is multiplied by and amount that equals 1 plus the total number of correct over/under picks. For example, if a player correctly picked the over/under in 5 matches, the player's total points will be multiplied by 6 (1 plus the 5 correct over/under picks) to get a final score for the player in that pick 'em game entry.

It will be apparent to those skilled in the art that various modifications to the disclosed embodiments without departing from the spirit or scope of the invention. Thus, it is intended that the present invention covers the modifications and variations disclosed above provided that these changes come within the scope of the claims and their equivalents.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding U.S. Provisional application No. 63/444,095, filed Feb. 8, 2023, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of managing a betting platform to determine results for a set of games over a private network, the method comprising:

setting match data for a match of the set of games, wherein the match data includes a point spread, a moneyline, and an over/under amount for each game of the set of games;

providing a date and time stamp for the match data and a pick 'em game entry;

receiving picks for the match of the set of games;

associating the picks with the match based on the data and time stamp;

determining a purchase amount associated with the picks for the match;

receiving a payment for the purchase amount over a network from a local depository within the private network and associated with a location of a player on the network, wherein the local depository changes as the location of the player changes;

depositing the payment for the purchase amount into a central depository for the private network from the local depository;

receiving results for the set of games, wherein the results include a score and statistics for each game; and determining a winner for the match based on the picks and the results for the set of games.

2. The method of claim 1, further comprising paying a prize or winning amount based on the winner to the local depository from the central depository.

3. A method of managing a betting platform to determine results for a set of games over a private network, the method comprising:

setting match data for a match of the set of games, wherein the match data consists of a point spread, a moneyline, and an over/under amount for each game of the set of games;

providing a date and time stamp for the match data and a pick 'em game entry;

receiving picks for the match of the set of games;

associating the picks with the match based on the data and time stamp;

determining a purchase amount associated with the picks for the match;

receiving a payment for the purchase amount over a network from a local depository within the private network and associated with a location of a player on the network, wherein the local depository changes as the location of the player changes;

depositing the payment for the purchase amount into a central depository for the private network from the local depository;

receiving results for the set of games, wherein the results include a score and statistics for each game; and determining a winner for the match based on the picks and the results for the set of games.

* * * * *